(12) United States Patent
Iizuka

(10) Patent No.: US 10,894,871 B2
(45) Date of Patent: Jan. 19, 2021

(54) RUBBER COMPOSITION FOR USE IN TIRE TREADS

(71) Applicant: The Yokohama Rubber Co., LTD., Tokyo (JP)

(72) Inventor: Yusuke Iizuka, Hiratsuka (JP)

(73) Assignee: The Yokohama Rubber Co., LTD.

( * ) Notice: Subject to any disclaimer, the term of this patent is extended or adjusted under 35 U.S.C. 154(b) by 0 days.

(21) Appl. No.: 15/307,358

(22) PCT Filed: Apr. 28, 2015

(86) PCT No.: PCT/JP2015/062753
§ 371 (c)(1),
(2) Date: Oct. 27, 2016

(87) PCT Pub. No.: WO2015/166931
PCT Pub. Date: Nov. 5, 2015

(65) Prior Publication Data
US 2017/0044349 A1    Feb. 16, 2017

(30) Foreign Application Priority Data
Apr. 30, 2014  (JP) .................. 2014-094109

(51) Int. Cl.
*C08K 3/36* (2006.01)
*B60C 1/00* (2006.01)
(Continued)

(52) U.S. Cl.
CPC .................. *C08K 3/36* (2013.01); *B60C 1/00* (2013.01); *B60C 1/0016* (2013.01); *C08K 3/04* (2013.01);
(Continued)

(58) Field of Classification Search
CPC ...... C08K 3/36; C08K 3/04; C08K 2201/006; C08K 2201/014; B60C 1/00;
(Continued)

(56) References Cited

U.S. PATENT DOCUMENTS 5,780,538 A * 7/1998 Cohen .................. B60C 1/0016
524/261
5,914,364 A    6/1999 Cohen et al.
(Continued)

FOREIGN PATENT DOCUMENTS

JP    H10-001565    1/1998
JP    2002-003652    1/2002
(Continued)

OTHER PUBLICATIONS

JP 2006-182940 A, machine translation, JPO Japan Platform for Patent Information (J-PlatPat). (Year: 2006).*
(Continued)

*Primary Examiner* — Josephine L Chang
(74) *Attorney, Agent, or Firm* — Thorpe North & Western

(57) ABSTRACT

A rubber composition comprises: per 100 parts by weight of a diene-based rubber, from 70 to 95 parts by weight of an inorganic filler containing two types of silicas, a silica X and a silica Y, and a carbon black. A compounded amount of the silica X is x parts by weight and a compounded amount of the silica Y is y parts by weight. A total amount of the silica X and the silica Y (x+y) is 85% by weight or greater of the inorganic filler, and a weight ratio of the silica X to the silica Y (x/y) is from 1/3 to 2/1. A nitrogen adsorption specific surface area of the silica X is 160 $m^2/g \pm 10\%$, and a nitrogen adsorption specific surface area of the silica Y is 200 $m^2/g \pm 10\%$.

11 Claims, 1 Drawing Sheet

(51) Int. Cl.
  *C08K 3/04*   (2006.01)
  *C08L 9/06*   (2006.01)
  *C08L 7/00*   (2006.01)
  *C08L 15/00*  (2006.01)

(52) U.S. Cl.
  CPC ............... *C08L 7/00* (2013.01); *C08L 9/06* (2013.01); *C08L 15/00* (2013.01); *C08K 2201/006* (2013.01); *C08K 2201/014* (2013.01); *Y02T 10/86* (2013.01)

(58) Field of Classification Search
  CPC . B60C 1/0016; C08L 7/00; C08L 9/06; C08L 15/00; Y02T 10/862
  USPC ........................................................ 524/526
  See application file for complete search history.

(56) References Cited

U.S. PATENT DOCUMENTS

| | | | | |
|---|---|---|---|---|
| 2003/0037706 | A1* | 2/2003 | Uhrlandt | C01B 33/18 106/482 |
| 2014/0155520 | A1 | 6/2014 | Takeda | |
| 2014/0329931 | A1 | 11/2014 | Sato | |
| 2015/0099844 | A1 | 4/2015 | Takeda et al. | |
| 2015/0126643 | A1 | 5/2015 | Satou et al. | |
| 2015/0148447 | A1 | 5/2015 | Takeda | |

FOREIGN PATENT DOCUMENTS

| | | | |
|---|---|---|---|
| JP | 2006182940 A | * | 7/2006 |
| JP | 2009-091498 | | 4/2009 |
| JP | 2010155935 A | * | 7/2010 |
| JP | 2010275386 A | * | 12/2010 |
| JP | 2012188563 A | * | 10/2012 |
| JP | 2012-219224 | | 11/2012 |
| JP | 2013-036025 | | 2/2013 |
| JP | 2013-213179 | | 10/2013 |
| JP | 2013-227375 | | 11/2013 |
| WO | WO 2013/008927 | | 1/2013 |
| WO | WO 2013/099325 | | 7/2013 |
| WO | WO 2013/133432 | | 9/2013 |
| WO | WO 2013/157545 | | 10/2013 |
| WO | WO 2013/161876 | | 10/2013 |

OTHER PUBLICATIONS

JP 2010-155935 A, machine translation, JPO Japan Platform for Patent Information (J-PlatPat). (Year: 2010).*
JP 2010-275386 A, machine translation, EPO Espacenet. (Year: 2010).*
JP 2012-188563 A, machine translation, EPO Espacenet. (Year: 2012).*
International Search Report for International Application No. PCT/JP2015/062753 dated Aug. 11, 2015, 4 pages, Japan.

* cited by examiner

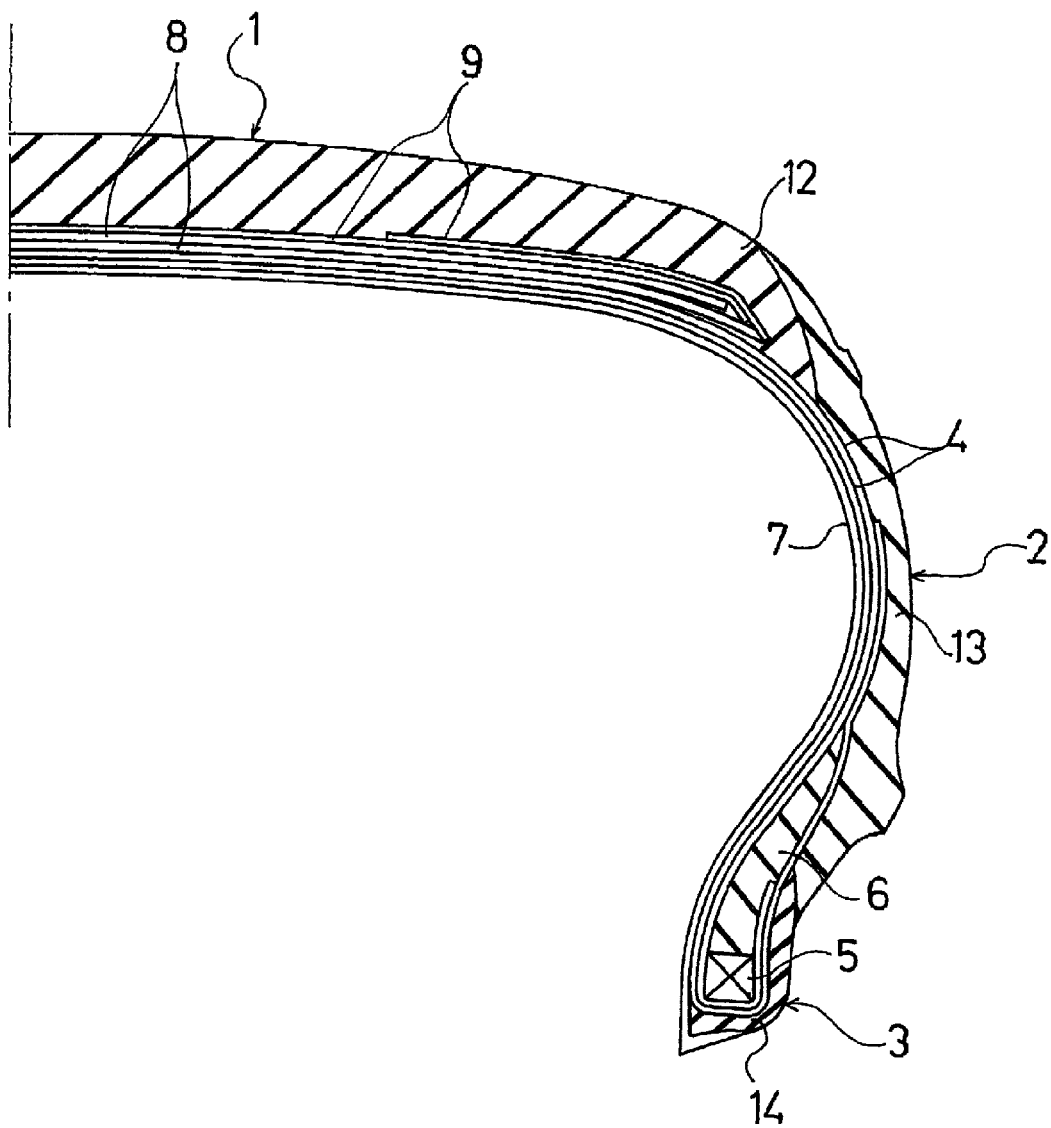

RUBBER COMPOSITION FOR USE IN TIRE TREADS

TECHNICAL FIELD

The present technology relates to a rubber composition for use in tire treads, the composition having low rolling resistance and wet performance and wear resistance that are enhanced beyond conventional levels.

BACKGROUND ART

In recent years, the JATMA (Japan Automobile Tyre Manufacturers Association, Inc.) labeling system (display) has been introduced for pneumatic tires for passenger cars, spurring a demand for tires with superior levels of both low rolling resistance and wet grip performance. At the same time, excellent wear resistance is demanded to extend life and enhance economical efficiency of the pneumatic tire.

Conventionally, it is known that silica is blended with rubber compositions that constitute tread portions of pneumatic tires in order to enhance the balance between low rolling resistance and wet grip performance. However, a problem exists in that the wear resistance is deteriorated when a large amount of silica is blended to enhance the low rolling resistance and the wet grip performance. Furthermore, when large compounded amounts of a styrene-butadiene rubber having a high glass transition temperature and an inorganic filler having a small particle diameter are employed to enhance the wet grip performance, it is difficult to achieve both the low rolling resistance and the wet grip performance since the rolling resistance is deteriorated.

Japanese Unexamined Patent Application Publication No. 2009-91498A proposes a rubber composition having excellent low heat build-up, wear resistance, and wet grip performance, formed by enhancing dispersibility of silica using a terminal-modified solution-polymerized styrene-butadiene rubber in which the terminal is modified by a polyorganosiloxane or the like. However, as the labeling system spreads, the level of enhancement that is demanded by consumers for low rolling resistance, wet grip performance, and wear resistance grows higher, and further enhancement in balance between these performances has been demanded.

SUMMARY

The present technology provides a rubber composition for use in tire treads by which low rolling resistance, wet performance, and wear resistance are enhanced to or beyond conventional levels.

A rubber composition for use in tire treads of the present technology comprises: per 100 parts by weight of a diene-based rubber containing 50% by weight or greater of a terminal-modified solution-polymerized styrene-butadiene rubber and from 10 to 30% by weight of a natural rubber, from 70 to 95 parts by weight of an inorganic filler containing two types of silicas, a silica X and a silica Y, and a carbon black. When a compounded amount of the silica X is taken to be x parts by weight and a compounded amount of the silica Y is taken to be y parts by weight, a total amount of the silica X and the silica Y (x+y) is 85% by weight or greater of the inorganic filler, and a weight ratio of the silica X to the silica Y (x/y) is from 1/3 to 2/1; and a nitrogen adsorption specific surface area of the silica X is in a range of 160 m$^2$/g±10%, and a nitrogen adsorption specific surface area of the silica Y is in a range of 200 m$^2$/g±10%.

The rubber composition for use in tire treads of the present technology can enhance low rolling resistance, wet grip performance, and wear resistance to or beyond conventional levels since, in a diene-based rubber containing 50% by weight or greater of a terminal-modified solution-polymerized styrene-butadiene rubber and from 10 to 30% by weight of a natural rubber, the total amount of the inorganic filler is set to 70 to 95 parts by weight and the weight ratio of the silica X to the silica Y, having a particular particle properties described above and the proportion of the silicas relative to the amount of the inorganic filler are limited.

Furthermore, an alkyltriethoxysilane having an alkyl group having from 7 to 20 carbons is preferably blended in an amount of 0.1 to 20% by weight of the total amount of the silicas (x+y) to achieve the low rolling resistance and the wet grip performance at even higher levels.

A glass transition temperature of the terminal-modified solution-polymerized styrene-butadiene rubber is preferably −35° C. or higher to further enhance the wet grip performance. Furthermore, a styrene unit content of the terminal-modified solution-polymerized styrene-butadiene rubber is preferably 35% by weight or greater to enhance the wear resistance and the wet grip performance by making the rubber strength higher.

A pneumatic tire in which the rubber composition for use in tire treads of the present technology is used can enhance the low rolling resistance, the wet grip performance, and the wear resistance to or beyond conventional levels.

BRIEF DESCRIPTION OF DRAWINGS

FIG. 1 is a partial cross-sectional view in a tire meridian direction illustrating an example of an embodiment of a pneumatic tire in which a rubber composition for use in tire treads of the present technology is used.

DETAILED DESCRIPTION

FIG. 1 illustrates an example of an embodiment of a pneumatic tire in which a rubber composition for use in tire treads is used. The pneumatic tire includes a tread portion 1, sidewall portions 2, and bead portions 3.

In FIG. 1, in a pneumatic tire, two carcass layers 4 are disposed extending between the left and right side bead portions 3. Each carcass layer 4 is formed by arranging and embedding reinforcing cords, which extend in a tire radial direction, in a rubber layer at a predetermined pitch in a tire circumferential direction. Each end portion of the carcass layers 4 folds back around a bead core 5 embedded in the bead portion 3 from the inside to the outside in a tire axial direction to sandwich a bead filler 6. An innerliner layer 7 is disposed inward of the carcass layer 4. Two belt layers 8 are disposed on an outer circumferential side of the carcass layer 4 of the tread portion 1. Each belt layer 8 is formed by arranging and embedding reinforcing cords, which extend inclined in the tire circumferential direction, in a rubber layer at a predetermined pitch in the tire axial direction. The inclination direction of the reinforcing cords of the two belt layers 8 intersect so as to be opposite each other in the tire circumferential direction. A belt cover layer 9 is disposed outward of the belt layers 8. The tread portion 1 is formed from a tread rubber layer 12 on an outer circumferential side of the belt cover layer 9. The tread rubber layer 12 is preferably composed of the rubber composition for use in tire treads of the present application. A side rubber layer 13 is disposed outward of the carcass layers 4 in each side wall portion 2, and a rim cushion rubber layer 14 is provided outward of the portion of each carcass layer 4 that is folded back around the bead portion 3. Note that the pneumatic tire of the present technology is not limited by the embodiment of the tire illustrated in FIG. 1.

In the rubber composition for use in tire treads of the present technology, the rubber component is formed from a diene-based rubber and always contains a terminal-modified solution-polymerized styrene-butadiene rubber (hereinafter, referred to as "modified S-SBR") and a natural rubber.

In the present technology, the modified S-SBR is a solution-polymerized styrene-butadiene rubber in which a terminal or both terminals of the styrene-butadiene rubber main chain are modified by functional group(s) having reactivity with a silanol group on the surface of the silica. The functional group that reacts with a silanol group is preferably at least one type selected from a hydroxyl group-containing polyorganosiloxane structure, an alkoxysilyl group, a hydroxyl group, an aldehyde group, a carboxyl group, an amino group, an imino group, an epoxy group, an amide group, a thiol group, and an ether group. Among these, the hydroxyl group-containing polyorganosiloxane structure, the hydroxyl group, and the amino group are more preferable.

The glass transition temperature of the modified S-SBR is preferably −35° C. or higher, and more preferably from −30° C. to −15° C. When the glass transition temperature of the modified S-SBR is lower than −35° C., the wet grip performance may be insufficient. For the glass transition temperature of the modified S-SBR, a thermogram is measured by differential scanning calorimetry (DSC) at a rate of temperature increase of 20° C./minute and the temperature at the midpoint of the transition region is defined as the glass transition temperature. Furthermore, when the modified S-SBR is an oil-extended product, the glass transition temperature is a glass transition temperature of the modified S-SBR in a condition free of an oil-extending component (oil).

The styrene unit content of the modified S-SBR is preferably 35% by weight or greater, and more preferably from 35 to 40% by weight. When the styrene unit content of the modified S-SBR is less than 35% by weight, stiffness and strength of the rubber composition are insufficient, and thus the wear resistance and the wet grip performance cannot be sufficiently enhanced. Note that the styrene unit content of the modified S-SBR is measured by infrared spectroscopy (Hampton method).

In the rubber composition for use in tire treads of the present technology, the content of the modified S-SBR is 50% by weight or greater, preferably from 55 to 90% by weight, and more preferably from 60 to 85% by weight, per 100% by weight of the diene-based rubber. When the content of the modified S-SBR is less than 50% by weight, the rolling resistance cannot be reduced while the wear resistance deteriorates. The upper limit of the content of the modified S-SBR is 90% by weight per 100% by weight of the diene-based rubber. When the content of the modified S-SBR is greater than 90% by weight, the wear resistance deteriorates.

In the present technology, a natural rubber is contained at 10 to 30% by weight per 100% by weight of the diene-based rubber. By compounding the natural rubber, the rolling resistance can be further reduced while the wear resistance is significantly enhanced. When the content of the natural rubber is less than 10% by weight, the effect of enhancing the wear resistance and the rolling resistance cannot be exhibited sufficiently. Furthermore, when the content of the natural rubber is greater than 30% by weight, the rolling resistance increases and the wear resistance decreases. The content of the natural rubber is preferably from 10 to 20% by weight, and more preferably from 15 to 20% by weight. In the rubber composition for use in tire treads, the total of the modified S-SBR and the natural rubber preferably compose the 100% by weight of the diene-based rubber to achieve even better low rolling resistance, wet grip performance, and wear resistance.

The rubber composition for use in tire treads of the present technology may optionally contain another diene-based rubber besides the modified S-SBR and the natural rubber described above. Examples of the other diene-based rubber include isoprene rubbers, butadiene rubbers, unmodified solution-polymerized or emulsion-polymerized styrene-butadiene rubbers, terminal-modified solution-polymerized styrene-butadiene rubbers other than the modified S-SBR described above, terminal-modified emulsion-polymerized styrene-butadiene rubbers, butyl rubbers, bromides of isobutylene/p-methylstyrene copolymer rubbers, ethylene-propylene-diene rubbers, and the like. Among these, butadiene rubbers, modified or unmodified emulsion-polymerized styrene-butadiene rubbers, unmodified solution-polymerized styrene-butadiene rubbers, terminal-modified solution-polymerized styrene-butadiene rubbers other than the modified S-SBR described above, and bromides of isobutylene/p-methylstyrene copolymer rubbers are preferable. Note that a terminal-modified solution-polymerized styrene-butadiene rubber other than the modified S-SBR described above means a terminal-modified solution-polymerized styrene-butadiene rubber having a glass transition temperature of lower than −35° C. and/or a styrene unit content of less than 35% by weight.

The rubber composition for use in tire treads of the present technology contains two types of silicas which are a silica X having a nitrogen adsorption specific surface area in a range of 160 $m^2/g \pm 10\%$ and a silica Y having a nitrogen adsorption specific surface area in a range of 200 $m^2/g \pm 10\%$. By compounding the silica X and the silica Y, it is possible to suppress heat build-up in the rubber composition and reduce the rolling resistance and enhance the wet grip performance and the wear resistance when the rubber composition is used in a tire.

The silica X used in the present technology has a nitrogen adsorption specific surface area in a range of 160 $m^2/g \pm 10\%$, preferably from 145 to 175 $m^2/g$, and more preferably from 150 to 170 $m^2/g$. By compounding the silica X, the rolling resistance can be reduced. When the nitrogen adsorption specific surface area of the silica X is less than 144 $m^2/g$, the wet grip performance is insufficient. Moreover, the nitrogen adsorption specific surface area of the silica X and that of the silica Y are determined in accordance with the BET ((Brunauer, Emmett and Teller) method of ASTM D 3037-81.

Furthermore, the silica Y has a nitrogen adsorption specific surface area in a range of 200 $m^2/g \pm 10\%$, preferably from 185 to 215 $m^2/g$, and more preferably from 200 to 215 $m^2/g$. By compounding the silica Y, the wet grip performance can be enhanced. When the nitrogen adsorption specific surface area of the silica Y is less than 180 $m^2/g$, the wet grip performance cannot be ensured. Furthermore, when the nitrogen adsorption specific surface area of the silica Y is greater than 220 $m^2/g$, the rolling resistance becomes greater.

In the present technology, when the compounded amount of the silica X is taken to be x parts by weight and the compounded amount of the silica Y is taken to be y parts by weight per 100 parts by weight of the diene-based rubber, a total compounded amount of the silicas X and Y (x+y) is 85% by weight or greater, and preferably from 90 to 95% by weight, of the inorganic filler. When the total amount of the silica X and the silica Y (x+y) is less than 85% by weight of the inorganic filler, the balance between the low rolling resistance and the wet grip performance cannot be enhanced. Note that the total compounded amount of the silicas X and Y (x+y) is not particularly limited; however, the total compounded amount is preferably from 70 to 90.25 parts by weight, and more preferably from 75 to 85 parts by weight. By setting the total compounded amount of the silicas (x+y) to 90.25 parts by weight or less, the balance between the rolling resistance and the wet grip performance can be enhanced while the wear resistance is ensured.

Furthermore, the weight ratio (x/y) of the compounded amount x of the silica X to the compounded amount y of the silica Y is from 1/3 to 2/1, and preferably from 1/2 to 2/1. When the compounded amount y (part by weight) of the silica Y is less than 1/2 of the compounded amount x (part by weight) of the silica X (less than x/2), the rolling resistance becomes greater. Furthermore, when the compounded amount y (part by weight) of the silica Y is greater than 3 times the compounded amount x (part by weight) of the silica X (greater than 3x), the wet grip performance deteriorates.

The silica X and silica Y used in the present technology should be silica having the above-mentioned characteristics, and can be selected as appropriate from among commercially available products. In addition, the silica X and silica Y may be produced using conventional methods so as to have the above-mentioned characteristics. Types of silica that can be used include wet method silica, dry method silica, surface treated silica, and the like.

The rubber composition for use in tire treads of the present technology always contains a carbon black together with the silica X and the silica Y described above. The compounded amount of the inorganic filler containing the silica X, the silica Y, and the carbon black is from 70 to 95 parts by weight, and preferably from 80 to 95 parts by weight, per 100 parts by weight of the diene-based rubber. When the compounded amount of the inorganic filler is less than 70 parts by weight, the wet grip performance and the wear resistance deteriorate. Furthermore, when the compounded amount of the inorganic filler is greater than 95 parts by weight, the rolling resistance becomes greater.

In the present technology, by compounding the carbon black, the wear resistance can be enhanced by increasing the rubber strength. The compounded amount of the carbon black is set in a manner that the total amount of the inorganic filler and the proportion of the amount of the silicas (x+y) in the inorganic filler described above are satisfied.

Furthermore, another inorganic filler besides the silica X, the silica Y, and the carbon black can be further compounded. Examples of other inorganic fillers include clay, talc, calcium carbonate, mica, aluminum hydroxide, and the like. However, the compounded amount of the other inorganic filler is in a range that does not prevent achieving the object of the present technology.

In the rubber composition of the present technology, a silane coupling agent is preferably compounded together with the silica X and the silica Y, and this enables enhancement of the dispersibility of the silicas and makes the reinforcing properties for the diene-based rubber even higher. The compounded amount of the silane coupling agent is preferably from 3 to 15 wt. %, and more preferably from 5 to 12 wt. %, of the compounded amount of the silica. In cases in which the compounded amount of the silane coupling agent is less than 3 wt. % of weight of the silica, the effect of enhancing silica dispersibility is not sufficiently obtained. In addition, if the compounded amount of the silane coupling agent exceeds 15 wt. %, the silane coupling agents undergo condensation with each other, and the desired effect is not obtained.

The silane coupling agent is not particularly limited, but is preferably a sulfur-containing silane coupling agent. Examples thereof include bis-(3-triethoxysilylpropyl)tetrasulfide, bis-(3-triethoxysilylpropyl)disulfide, 3-trimethoxysilylpropyl benzothiazole tetrasulfide, γ-mercaptopropyltriethoxysilane, 3-octanoylthiopropyl triethoxysilane, and derivatives thereof, and the like. Derivatives include NXT-Z (manufactured by Momentive Performance Materials Inc.).

By blending an alkyltriethoxysilane having an alkyl group having from 7 to 20 carbons, the rubber composition for use in tire treads of the present technology can suppress aggregation of the silicas and increase in the viscosity of the rubber composition and can enhance the low rolling resistance, the wet performance, and the wear resistance.

The alkyltriethoxysilane has an alkyl group having from 7 to 20 carbons, and preferably an alkyl group having from 8 to 10 carbons. Examples of the alkyl group having from 7 to 20 carbons include a heptyl group, octyl group, nonyl group, decyl group, undecyl group, dodecyl group, tridecyl group, tetradecyl group, pentadecyl group, hexadecyl group, heptadecyl group, octadecyl group, nonadecyl group, and icosyl group. Among these, from the perspective of miscibility with the diene-based rubber, an octyl group or nonyl group is more preferable.

The compounded amount of the alkyltriethoxysilane is preferably from 0.1 to 20% by weight, and more preferably from 1 to 10% by weight, relative to the total compounded amount of the silicas X and Y (x+y). When the compounded amount of the alkyltriethoxysilane is less than 0.1% by weight, the effect of reducing the rolling resistance, while the wear resistance is ensured, may not be achieved. Furthermore, when the compounded amount of the alkyltriethoxysilane is greater than 20% by weight, the wear resistance may be lowered since the rolling resistance becomes greater.

In addition to the fillers described above, the rubber composition for use in tire treads may also contain various types of additives that are commonly used in rubber compositions for use in tire treads, such as vulcanization and crosslinking agents, vulcanization accelerators, antiaging agents, plasticizers, and processing aids. These additives may be kneaded according to any common method to form the rubber composition and may be used in vulcanization or crosslinking. The compounded amount of these additives may be any conventional amount, as long as the object of the present technology is not impaired. Such a rubber composition can be produced by mixing the components described above using a publicly known rubber kneading machine, such as a Banbury mixer, a kneader, a roll, and the like.

The rubber composition for use in tire treads of the present technology can be suitably used in pneumatic tires, and in tire tread portions in particular. A pneumatic tire in which this rubber composition is used exhibits low rolling resistance and excellent fuel consumption performance, and also exhibits excellent wet grip performance. Furthermore, excellent wear resistance can be achieved and the tire durability can be enhanced.

The present technology is further described below using examples. However, the scope of the present technology is not limited to these examples.

Examples

Each of 18 types of rubber compositions for use in tire treads (Working Examples 1 to 6 and Comparative Examples 1 to 12) was prepared according to the formulations shown in Table 1 and 2 with the compounding agents shown in Table 3 used as common components. With the exception of the sulfur and the vulcanization accelerator, the components were kneaded in a 1.7 L sealed mixer for 5 minutes. The mixture was then extruded as a master batch and cooled at room temperature, the sulfur and the vulcanization accelerator were added, and the mixture was then kneaded in a 1.7 L sealed mixer. Note that, in Tables 1 and 2, since the modified S-SBR 1 contains 25 parts by weight of oil-extension oil and the unmodified SBR contains 37.5 parts by weight of oil-extension oil, each row of the compounded amounts shows the actual compounded amount as well as the net compounded amount of the SBR excluding the oil-extension oil in a parenthesis. In addition, the compounded amount of the aroma oil was adjusted as appropriate so that the total oil amount in the rubber composition and/or rubber hardness were at comparable levels. Note that the amounts of the compounding agents shown in Table 3 are shown in terms of part by weight relative to 100 parts by weight of the diene-based rubbers shown in Tables 1 and 2 (net rubber amounts).

The total amounts of the inorganic fillers containing the silica X, the silica Y, and the carbon black are shown in the "Total amount of inorganic filler" rows. The proportions of the silicas relative to the total amount of the silicas and the carbon black are shown in the "silica (x+y) proportion" rows. The weight ratios (x/y) of the silica X to the silica Y are shown in the "Silica ratio (x/y)" rows.

The obtained 18 types of rubber compositions for use in tire treads were vulcanization by compression molding for 20 minutes at 160° C. in dies having a predetermined shape to produce vulcanized rubber samples. The obtained vulcanized rubber samples were used to evaluate the wear resistance, wet performance, and rolling resistance by the methods described below.

Wear Resistance

The amount of wear of the obtained vulcanized rubber samples was measured in accordance with JIS (Japanese Industrial Standard) K6264, using a Lambourn abrasion test machine (manufactured by Iwamoto Seisakusho Co. Ltd.) under the following conditions: temperature=20° C., load=39 N, slip rate 30%, time=4 minutes. The obtained results are shown in the rows of "Wear resistance" in Tables 1 and 2 as index values based on the reciprocal of the value of Comparative Example 1 expressed as an index value of 100. Larger index values indicate superior wear resistance.

Wet Performance and Rolling Resistance

The wet performance and the rolling resistance of the obtained vulcanized rubber samples were evaluated based on the loss tangent tan δ (0° C.) and tan δ (60° C.), which are known as indicators of these. The loss tangent tan δ was measured using a viscoelasticity spectrometer (manufactured by Toyo Seiki Seisaku-sho, Ltd.) under the following conditions: 10% initial strain, ±2% amplitude, 20 Hz frequency, and temperatures at 0° C. and 60° C.

The obtained tan δ (0° C.) results are shown in the rows of "Wet performance" in Tables 1 and 2 as index values based on the value of Comparative Example 1 expressed as an index value of 100. Larger index values of the wet performance indicate larger tan δ (0° C.) and superior wet grip performance.

The obtained results of tan δ (60° C.) are shown in the rows of "Rolling resistance" in Tables 1 and 2 as index values based on the reciprocal of the value of Comparative Example 1 expressed as an index value of 100. Larger index values of the rolling resistance indicate smaller tan δ (60° C.) and lower heat build-up, which in turn indicate a smaller rolling resistance and superior fuel consumption performance when a pneumatic tire is formed.

TABLE 1

|  |  | Comparative Example 1 | Comparative Example 2 | Comparative Example 3 |
|---|---|---|---|---|
| NR | Part by weight | 15 | 15 | 15 |
| Modified S-SBR 2 | Part by weight | 85 | 85 | 85 |
| Unmodified SBR | Part by weight |  |  |  |
| Silica X (x) | Part by weight | 80 |  | 65 |
| Silica Y (y) | Part by weight |  | 80 | 65 |
| Silica Z | Part by weight |  |  |  |
| Carbon black | Part by weight | 10 | 10 | 10 |
| Coupling agent | Part by weight | 6.4 | 6.4 | 10.4 |
| Aroma oil | Part by weight | 20 | 20 | 60 |
| Total amount of inorganic filler | (part by weight) | (90) | (90) | (140) |
| Proportion of silicas (x + y) | % by weight | 88.9 | 88.9 | 92.9 |
| Silica ratio (x/y) |  | — | 0 | 1.0 |
| Wear resistance | Index value | 100 | 100 | 106 |
| Wet performance | Index value | 100 | 105 | 110 |
| Rolling resistance | Index value | 100 | 90 | 88 |

|  |  | Comparative Example 4 | Comparative Example 5 | Comparative Example 6 |
|---|---|---|---|---|
| NR | Part by weight | 15 | 15 |  |
| Modified S-SBR 2 | Part by weight | 85 | 15 | 100 |
| Unmodified SBR | Part by weight |  | 96.25 (70) |  |
| Silica X (x) | Part by weight | 28 | 40 | 40 |
| Silica Y (y) | Part by weight | 28 | 40 | 40 |
| Silica Z | Part by weight |  |  |  |
| Carbon black | Part by weight | 10 | 10 | 10 |
| Coupling agent | Part by weight | 4.5 | 6.4 | 6.4 |
| Aroma oil | Part by weight | 5 | 20 | 20 |

TABLE 1-continued

|  |  |  |  |  |
|---|---|---|---|---|
| Total amount of inorganic filler | (part by weight) | (66) | (90) | (90) |
| Proportion of silicas (x + y) | % by weight | 84.8 | 88.9 | 88.9 |
| Silica ratio (x/y) |  | — | 1.0 | 1.0 |
| Wear resistance | Index value | 93 | 93 | 90 |
| Wet performance | Index value | 91 | 110 | 100 |
| Rolling resistance | Index value | 112 | 98 | 103 |

|  |  | Comparative Example 7 | Comparative Example 8 | Comparative Example 9 |
|---|---|---|---|---|
| NR | Part by weight | 40 | 15 | 15 |
| Modified S-SBR 2 | Part by weight | 60 | 85 | 85 |
| Unmodified SBR | Part by weight |  |  |  |
| Silica X (x) | Part by weight | 40 | 35 | 45 |
| Silica Y (y) | Part by weight | 40 | 35 | 45 |
| Silica Z | Part by weight |  |  |  |
| Carbon black | Part by weight | 10 | 20 |  |
| Coupling agent | Part by weight | 6.4 | 5.6 | 7.2 |
| Aroma oil | Part by weight | 20 | 20 | 20 |
| Total amount of inorganic filler | (part by weight) | (90) | (90) | (90) |
| Proportion of silicas (x + y) | % by weight | 88.9 | 77.8 | 100.0 |
| Silica ratio (x/y) |  | 1.0 | 1.0 | 1.0 |
| Wear resistance | Index value | 105 | 102 | 96 |
| Wet performance | Index value | 96 | 97 | 103 |
| Rolling resistance | Index value | 105 | 96 | 103 |

TABLE 2

|  |  | Comparative Example 10 | Comparative Example 11 | Comparative Example 12 | Working Example 1 |
|---|---|---|---|---|---|
| NR | Part by weight | 15 | 15 | 15 | 15 |
| Modified S-SBR 1 | Part by weight |  |  |  |  |
| Modified S-SBR 2 | Part by weight | 85 | 85 | 85 | 85 |
| Silica X (x) | Part by weight | 40 |  | 45 | 40 |
| Silica Y (y) | Part by weight |  | 40 | 45 | 40 |
| Silica Z | Part by weight | 40 | 40 |  |  |
| Carbon black | Part by weight | 10 | 10 | 10 | 10 |
| Coupling agent | Part by weight | 6.4 | 6.4 | 7.2 | 6.4 |
| Alkylsilane | Part by weight |  |  |  |  |
| Aroma oil | Part by weight | 20 | 20 | 30 | 20 |
| Total amount of inorganic filler | (part by weight) | (90) | (90) | (100) | (90) |
| Proportion of silicas (x + y) | % by weight | 88.9 | 88.9 | 90.0 | 88.9 |
| Silica ratio (x/y) |  | — | — | 1.0 | 1.0 |
| Wear resistance | Index value | 100 | 100 | 103 | 102 |
| Wet performance | Index value | 96 | 102 | 103 | 101 |
| Rolling resistance | Index value | 105 | 95 | 96 | 106 |

|  |  | Working Example 2 | Working Example 3 | Working Example 4 | Working Example 5 | Working Example 6 |
|---|---|---|---|---|---|---|
| NR | Part by weight | 15 | 15 | 15 | 15 | 15 |
| Modified S-SBR 1 | Part by weight |  | 87.5 (70) |  |  |  |
| Modified S-SBR 2 | Part by weight | 85 | 15 | 85 | 85 | 85 |
| Silica X (x) | Part by weight | 40 | 40 | 30 | 50 | 35 |
| Silica Y (y) | Part by weight | 40 | 40 | 50 | 30 | 35 |
| Silica Z | Part by weight |  |  |  |  |  |
| Carbon black | Part by weight | 10 | 10 | 10 | 10 | 5 |
| Coupling agent | Part by weight | 6.4 | 6.4 | 6.4 | 6.4 | 5.6 |
| Alkylsilane | Part by weight | 2 | 2 | 2 | 2 | 2 |
| Aroma oil | Part by weight | 20 | 20 | 20 | 20 | 10 |
| Total amount of inorganic filler | (part by weight) | (90) | (90) | (90) | (90) | (75) |
| Proportion of silicas (x + y) | % by weight | 88.9 | 88.9 | 88.9 | 88.9 | 93.3 |
| Silica ratio (x/y) |  | 1.0 | 1.0 | 0.60 | 1.7 | 1.0 |
| Wear resistance | Index value | 103 | 105 | 104 | 103 | 100 |
| Wet performance | Index value | 103 | 120 | 105 | 102 | 101 |
| Rolling resistance | Index value | 108 | 108 | 105 | 110 | 112 |

The types of raw materials used as indicated in Tables 1 to 2 are described below.

NR: natural rubber, SIR20

Modified S-SBR 1: Solution-polymerized styrene-butadiene rubber having a glycidylamine group at a terminal, Tufdene F3420, manufactured by Asahi Kasei Chemicals Corporation; styrene unit content: 36% by weight; glass transition temperature: −27° C.; oil extended product containing 25 parts by weight of oil per 100 parts by weight of rubber component Modified S-SBR 2: Solution-polymerized styrene-butadiene rubber having a hydroxyl group at a terminal, Nipol NS612, manufactured by Zeon Corporation; styrene unit content: 16% by weight; glass transition temperature: −63° C.; not oil-extended Unmodified SBR: HPR755, manufactured by JSR Corporation; styrene unit content: 40% by weight; glass transition temperature: −20° C.; oil extended product containing 37.5 parts by weight of oil per 100 parts by weight of rubber component Silica X: Zeosil 165GR, manufactured by Rhodia; nitrogen adsorption specific surface area: 165 m$^2$/g Silica Y: Zeosil 200MP, manufactured by Rhodia; nitrogen adsorption specific surface area: 200 m$^2$/g Silica Z: Zeosil 115GR, manufactured by Rhodia; nitrogen adsorption specific surface area: 110 m$^2$/g Carbon black: SEAST KHP, manufactured by Tokai Carbon Co., Ltd.

Silane coupling agent: Sulfur-containing silane coupling agent, Si69, manufactured by Evonik Degussa Alkylsilane: Octyltriethoxysilane, KBE-3083, manufactured by Shin-Etsu Chemical Co., Ltd.

Aroma oil: Extract 4S, manufactured by Showa Shell Sekiyu K.K.

TABLE 3

| Common components of the rubber compositions | | |
| --- | --- | --- |
| Zinc oxide | Part by weight | 3.0 |
| Sulfur | Part by weight | 1.0 |
| Vulcanization accelerator 1 | Part by weight | 2.0 |

The types of raw materials used as indicated in Table 3 are shown below.

Zinc oxide: Zinc Oxide III, manufactured by Seido Chemical Industry Co., Ltd.

Sulfur: Oil-treated sulfur, manufactured by Karuizawa Refinery Ltd.

Vulcanization accelerator: Nocceler CZ-G manufactured by Ouchi Shinko Chemical Industrial Co., Ltd.

As is clear from Table 2, it was confirmed that the rubber compositions for use in tire treads of Working Examples 1 to 6 maintained or enhanced the wet grip performance (tan δ at 0° C.), the low rolling resistance (tan δ at 60° C.), and the wear resistance.

The rubber composition of Comparative Example 1 is a rubber composition used as a conventional example in which only the silica X was compounded and the silica Y was not compounded.

Since the rubber composition of Comparative Example 2 contained only the silica Y and no silica X, the rolling resistance deteriorated.

With the rubber composition of Comparative Example 3, since the total amount of the inorganic filler, containing the silica X, the silica Y, and the carbon black, was greater than 95 parts by weight, the rolling resistance deteriorated.

With the rubber composition of Comparative Example 4, since the total amount of the inorganic filler, containing the silica X, the silica Y, and the carbon black, was less than 70 parts by weight and the proportion of the silicas in the inorganic filler was less than 85% by weight, the wet grip performance and the wear resistance deteriorated.

With the rubber composition of Comparative Example 5, since the content of the modified S-SBR was less than 50% by weight, the wear resistance and the rolling resistance deteriorated.

Since the rubber composition of Comparative Example 6 contained no natural rubber, the wear resistance deteriorated.

With the rubber composition of Comparative Example 7, since the content of the natural rubber was greater than 30% by weight, the wet grip performance deteriorated.

With the rubber composition of Comparative Example 8, since the proportion of the silicas in the inorganic filler was less than 85% by weight, the rolling resistance and the wet grip performance deteriorated.

Since the rubber composition of Comparative Example 9 contains no carbon black, the wear resistance deteriorated.

Since the rubber composition of Comparative Example 10 contained the silica Z having a nitrogen adsorption specific surface area of less than 144 m$^2$/g in place of the silica Y, the wet grip performance deteriorated.

Since the rubber composition of Comparative Example 11 contained the silica Z having a nitrogen adsorption specific surface area of less than 144 m$^2$/g in place of the silica X, the rolling resistance deteriorated.

With the rubber composition of Comparative Example 12, since the total amount of the inorganic filler, containing the silica X, the silica Y, and the carbon black, was greater than 95 parts by weight, the rolling resistance deteriorated.

The invention claimed is:

1. A rubber composition for use in tire treads, the rubber composition comprising:
per 100 parts by weight of a diene-based rubber containing 80 to 90% by weight of a terminal-modified solution-polymerized styrene-butadiene rubber and from 10 to 20% by weight of a natural rubber, from 75 to 95 parts by weight of an inorganic filler containing two types of silicas, a silica X and a silica Y, and a carbon black;
where a compounded amount of the silica X is taken to be x parts by weight and a compounded amount of the silica Y is taken to be y parts by weight,
a total amount of the silica X and the silica Y (x+y) being 85% by weight or greater of the inorganic filler, and the total amount of the silica X and the silica Y (x+y) being 70 to 90.25 parts by weight per 100 parts by weight of the diene-based rubber, and a weight ratio of the silica X to the silica Y (x/y) being from 1/2 to 2/1;
a nitrogen adsorption specific surface area of the silica X being in a range of 150 to 170 m$^2$/g, and a nitrogen adsorption specific surface area of the silica Y being in a range of 200 to 215 m$^2$/g; and
the terminal-modified solution-polymerized styrene-butadiene rubber having a functional group selected from the group consisting of: a hydroxyl group-containing polyorganosiloxane structure and a hydroxyl group.

2. The rubber composition for use in tire treads according to claim 1, wherein a styrene unit content of the terminal-modified solution-polymerized styrene-butadiene rubber is 35% by weight or greater.

3. The rubber composition for use in tire treads according to claim 1, wherein a glass transition temperature of the terminal-modified solution-polymerized styrene-butadiene rubber is −35° C. or higher.

4. The rubber composition for use in tire treads according to claim 3, wherein a styrene unit content of the terminal-modified solution-polymerized styrene-butadiene rubber is 35% by weight or greater.

5. The rubber composition for use in tire treads according to claim 1, further comprising an alkyltriethoxysilane having an alkyl group having from 7 to 20 carbons in an amount of 0.1 to 20% by weight of the total amount of the silicas (x+y).

6. The rubber composition for use in tire treads according to claim 5, wherein a glass transition temperature of the terminal-modified solution-polymerized styrene-butadiene rubber is −35° C. or higher.

7. The rubber composition for use in tire treads according to claim 6, wherein a styrene unit content of the terminal-modified solution-polymerized styrene-butadiene rubber is 35% by weight or greater.

8. The rubber composition for use in tire treads according to claim 1, wherein the nitrogen adsorption specific surface area of the silica X is in a range of 165 to 170 $m^2/g$.

9. A pneumatic tire comprising the rubber composition for use in tire treads described in claim 1.

10. A rubber composition for use in tire treads, the rubber composition comprising:
per 100 parts by weight of a diene-based rubber containing 55 to 90% by weight of a terminal-modified solution-polymerized styrene-butadiene rubber and from 10 to 20% by weight of a natural rubber, from 70 to 95 parts by weight of an inorganic filler containing two types of silicas, a silica X and a silica Y, and a carbon black;
where a compounded amount of the silica X is taken to be x parts by weight and a compounded amount of the silica Y is taken to be y parts by weight,
a total amount of the silica X and the silica Y (x+y) being 85% by weight or greater of the inorganic filler, and a weight ratio of the silica X to the silica Y (x/y) being from 1/2 to 2/1;
a nitrogen adsorption specific surface area of the silica X being in a range of 150 to 175 $m^2/g$, and a nitrogen adsorption specific surface area of the silica Y being in a range of 185 to 215 $m^2/g$;
the rubber composition further comprising an alkyltriethoxysilane having an alkyl group having from 7 to 20 carbons in an amount of 0.1 to 20% by weight of the total amount of the silicas (x+y); and
the terminal-modified solution-polymerized styrene-butadiene rubber having a functional group selected from the group consisting of: a hydroxyl group-containing polyorganosiloxane structure and a hydroxyl group.

11. A rubber composition for use in tire treads, the rubber composition comprising:
per 100 parts by weight of a diene-based rubber containing 55 to 90% by weight of a terminal-modified solution-polymerized styrene-butadiene rubber and from 10 to 20% by weight of a natural rubber, from 70 to 95 parts by weight of an inorganic filler containing two types of silicas, a silica X and a silica Y, and a carbon black;
where a compounded amount of the silica X is taken to be x parts by weight and a compounded amount of the silica Y is taken to be y parts by weight,
a total amount of the silica X and the silica Y (x+y) being 85% by weight or greater of the inorganic filler, and a weight ratio of the silica X to the silica Y (x/y) being from 1/2 to 2/1; and
a nitrogen adsorption specific surface area of the silica X being in a range of 165 to 175 $m^2/g$, and a nitrogen adsorption specific surface area of the silica Y being in a range of 185 to 194 $m^2/g$; and
the terminal-modified solution-polymerized styrene-butadiene rubber having a functional group selected from the group consisting of: a hydroxyl group-containing polyorganosiloxane structure and a hydroxyl group.

\* \* \* \* \*